United States Patent [19]

Gat et al.

[11] Patent Number: 5,165,796
[45] Date of Patent: Nov. 24, 1992

[54] BICHANNEL RADIATION DETECTION APPARATUS

[75] Inventors: Arnon Gat, Palo Alto; Michael French, both of San Jose, Calif.

[73] Assignee: AG Processing Technologies, Inc., Sunnyvale, Calif.

[21] Appl. No.: 624,205

[22] Filed: Dec. 7, 1990

[51] Int. Cl.$^5$ ............ G01J 5/62; G01J 5/60; G01J 5.54; G01J 5/10
[52] U.S. Cl. .................. 374/128; 374/129; 374/127; 374/126; 250/338.1
[58] Field of Search .......... 374/1, 9, 126, 128, 374/129, 127, 133; 250/338.1; 356/45

[56] References Cited

U.S. PATENT DOCUMENTS

| | | | |
|---|---|---|---|
| 3,261,257 | 7/1966 | Pfister | 374/127 |
| 3,448,283 | 6/1969 | Highley et al. | 250/226 |
| 3,537,314 | 11/1970 | Svet | 374/9 |
| 3,539,807 | 11/1970 | Bickel | 374/129 |
| 3,611,805 | 10/1971 | Hishikari | 374/127 |
| 3,641,345 | 2/1972 | Coackley | 374/127 |
| 3,715,922 | 2/1973 | Menge | 374/127 |
| 3,735,136 | 5/1973 | Flint | 250/83 |
| 3,759,102 | 9/1973 | Murray | 73/355 |
| 3,806,249 | 4/1974 | Lesinski | 374/127 |

(List continued on next page.)

FOREIGN PATENT DOCUMENTS

| | | | |
|---|---|---|---|
| 242044 | 12/1962 | Australia. | |
| 0707105 | 4/1965 | Canada | 374/127 |
| 2339732 | 2/1975 | Fed. Rep. of Germany | 244/73 |
| 0144513 | 11/1980 | Japan | 374/9 |
| 160029 | 10/1982 | Japan. | |
| 0052531 | 3/1983 | Japan | 374/127 |
| 0139037 | 8/1983 | Japan | 374/127 |
| 131430 | 7/1985 | Japan. | |
| 253939 | 12/1985 | Japan. | |
| 0130834 | 6/1986 | Japan | 374/133 |
| 62-50627 | 3/1987 | Japan. | |
| 763698 | 12/1977 | U.S.S.R.. | |
| 1212685 | 11/1970 | United Kingdom. | |
| 2045425 | 10/1980 | United Kingdom. | |
| 2082767 | 3/1982 | United Kingdom. | |

OTHER PUBLICATIONS

"Temperature Measurement Validity for Dual Spectral-Band Radiometric Techniques" by Fehribach-/Johnson; Optical Engineering (Dec. 1989).

"On the Validity and Techniques of Temperature and Emissivity Measurements", by Fehribach, Johnson and Feng; University of Alabama in Huntsville (1988).

"Dual-Wavelength Radiation Thermometry: Emissivity Compensation Algorithms", by Tsai, Shoemaker et al.; International Journal of Thermophysics (May, 1989).

Summary of Splinter Workshop on "Materials Thermal & Thermoradiative Properties/Characterization Technology", by DeWitt/Ho; JPL Publication 89-16 (Jun. 1989).

"Industrial Radiation Thermometry", by Albert S. Tenney: Mechanical Engineering, (Oct. 1986).

"Advances in Dual-Wavelength Radiometry", by W. R. Barron, Sensors (Jan. 1990).

*Primary Examiner*—William A. Cuchlinski, Jr.
*Assistant Examiner*—Diego F. F. Gutierrez
*Attorney, Agent, or Firm*—A. C. Smith

[57] ABSTRACT

Apparatus for optically determining the temperature of an object in an environment at elevated temperature provides enhanced measurement accuracy by sensing radiation from the object in two or more different wavebands of radiation. The information derived therefrom is cyclically sampled and processed to provide corrected emissivity of the object. The temperature of the object is accurately determined from the corrected emissivity and sensed radiation therefrom. The apparatus includes a radiation detector for receiving radiation during an interval, an optical filter structure with a plurality of optical filters of different radiation transmissive characteristics, and sampling circuits for receiving the radiation signal from the detector during a selected period within the interval during which radiation is supplied to the detector; wherein the selected period is shorter than the interval, is determined in response to the cyclic operation of the filter structure, and contains the least amlitude gradient.

6 Claims, 4 Drawing Sheets

U.S. PATENT DOCUMENTS

| | | | |
|---|---|---|---|
| 3,849,000 | 11/1974 | Soardo et al. | 374/127 |
| 3,922,550 | 11/1975 | Crowley et al. | 374/9 |
| 4,144,758 | 3/1979 | Roney | 73/355 |
| 4,222,663 | 9/1980 | Gebhart et al. | 356/45 |
| 4,227,369 | 10/1980 | Williams | 60/734 |
| 4,432,657 | 2/1984 | Rudzki et al. | 374/126 |
| 4,561,786 | 12/1985 | Anderson | 374/129 |
| 4,579,461 | 4/1986 | Rudolph | 374/9 |
| 4,611,930 | 9/1986 | Stein | 374/126 |
| 4,659,234 | 4/1987 | Brouwer et al. | 374/127 |
| 4,708,493 | 11/1987 | Stein | 374/126 |
| 4,722,612 | 2/1988 | Junkert et al. | 374/124 |
| 4,729,668 | 3/1988 | Angel et al. | 374/127 |
| 4,764,025 | 8/1981 | Jensen | 374/144 |
| 4,817,020 | 3/1989 | Chande et al. | 374/127 |
| 4,854,727 | 8/1989 | Pecot et al. | 374/1 |
| 4,881,823 | 11/1989 | Tanaka et al. | 374/128 |

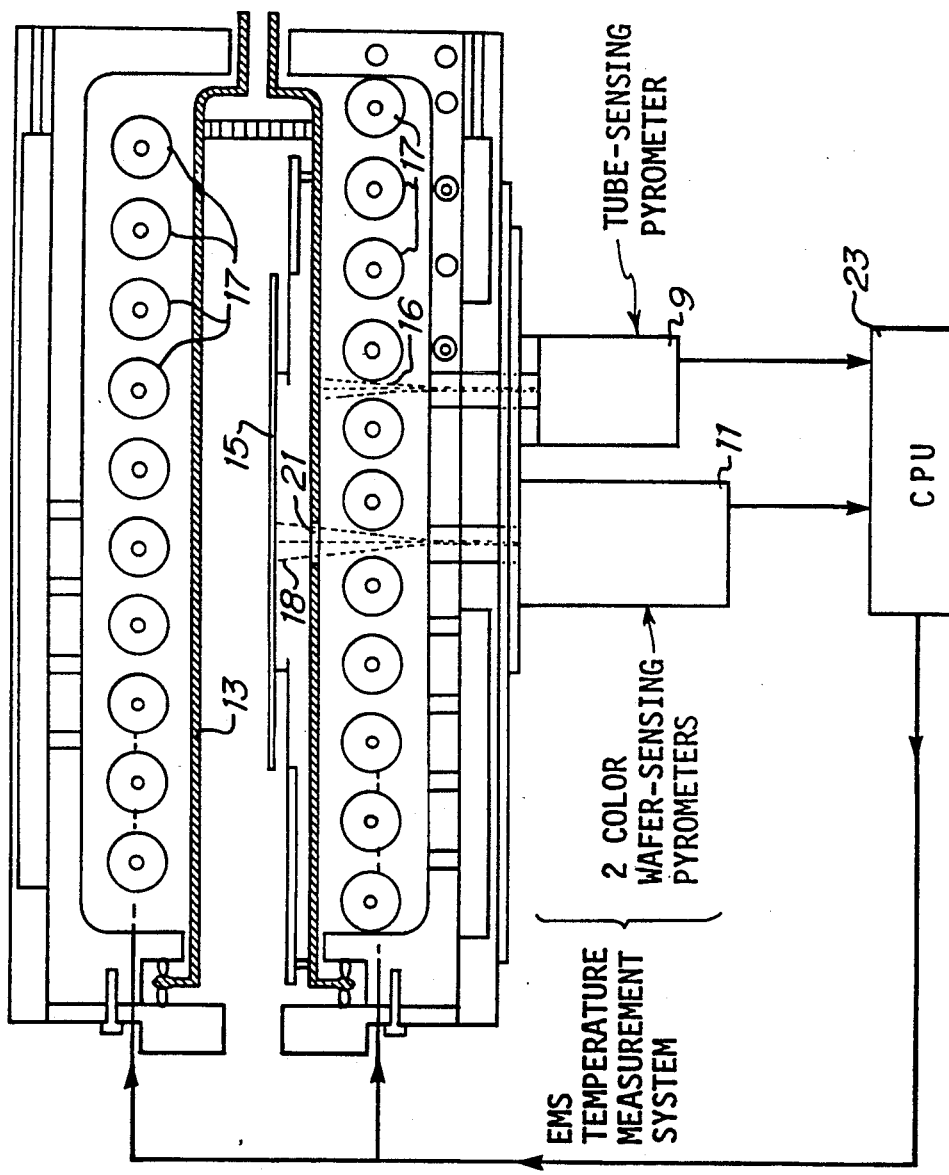

BICHANNEL RADIATION DETECTION APPARATUS

RELATED APPLICATIONS

The subject matter of this application relates to the subject matter disclosed in U.S. Pat. No. 4,919,542, and to the subject matter disclosed in U.S. Pat. No. 4,854,727, and to the subject matter disclosed in U.S. Pat. No. 5,061,084, and to the subject matter disclosed in pending application for U.S. patent Ser. No. 624,206 entitled "Bichannel Radiation Detection Method" filed on even date herewith by Arnon Gat and David Mordo, all of which subject matter is incorporated herein by this reference.

BACKGROUND OF INVENTION

Accurately measuring the elevated temperature of a remote object in a very hot environment, such as a a furnace, using optical techniques and without touching the object is complicated by reflections of ambient radiation from the environment along with radiation from the heated object itself. Optical pyrometry allows the temperature of an object to be measured remotely by analyzing the radiation emitted by the object. Of course, all objects at temperatures greater than 0 kelvin emit radiation which can be measured to determine the temperature of the object, provided the emissivity of the object is known. Thus, optical pyrometry operates upon the underlying principle that as the temperature of an object increases, the radiation it emits shifts in wavelength and increases in intensity so that an object which emits radiation with an orange glow is hotter than an otherwise identical object which emits radiation with a red glow. Such temperature-measuring schemes are discussed in the literature (see, for example, Tenney; *Mechanical Engineering*, Oct. 1986; "Red Hot ... AND HOTTER," pp. 36–41).

Certain processes for fabricating circuits on silicon wafers require accurate measurement from a remote location of the temperature of a wafer within a processing furnace. In these processes, the emissivity of the wafers may be altered by surface coatings on the wafers of different materials such as silicon dioxide or silicon nitride of different thicknesses, and optical temperature measurements of the wafers must therefore be corrected for emissivity of the wafer to provide accurate optical measurements of the wafer temperature.

SUMMARY OF INVENTION

In accordance with the present invention, the apparatus for measuring temperature of remote heated objects such as semiconductor wafers with varying emissivities in the presence of ambient radiation within a processing chamber utilizes optical pyrometry techniques. More specifically, the present invention accurately determines the temperature of a semiconductor wafer including diverse surface coatings within a surrounding environment which includes ambient radiation predominantly from local heating sources. In accordance with the illustrated embodiment of the present invention, multiple pyrometers or channels detect radiation from the wafer within the hot environment of a processing chamber within two or more different wavebands. The true temperature of the wafer is determined from the detected radiation emitted at different wavelengths from a single region of the wafer, and by using synchronous detection techniques on radiation detected within the two wavebands received from the wafer to determine concurrently its emissivity and the corrected temperature of the wafer.

BRIEF DESCRIPTION OF THE DRAWINGS

FIG. 3 is a pictorial sectional view of a thermal processing system illustrating the pyrometer configuration operatively arranged with respect to a wafer processing chamber.

DESCRIPTION OF THE PREFERRED EMBODIMENT

Figure 1A:
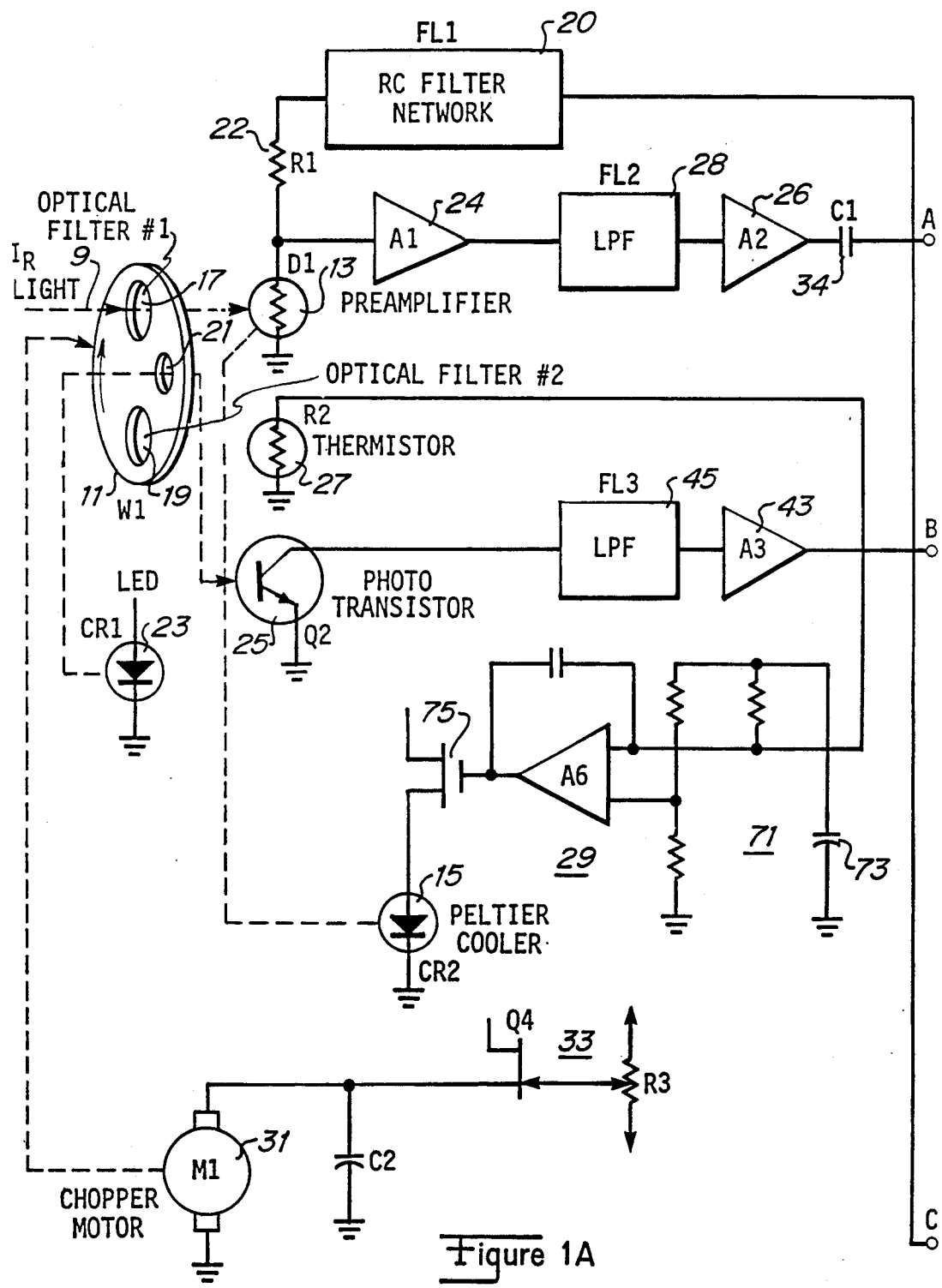
FIGS. 1A and 1B comprise a schematic diagram of temperature and emissivity detection circuitry according to the present invention.

Referring first to FIG. 3, there is shown a pictorial sectional view of a thermal processing system including a single-waveband pyrometer 9 oriented to sense radiation from the exterior wall of the quartz processing chamber 13, where the operating waveband is selected within the opaque region of the spectral properties of quartz. A two-color or two waveband pyrometer 11 is oriented to sense radiation from the bottom or back side of semiconductor wafer 15 within the processing chamber 13. Conventional non-coherent light source 17 such as gas-discharge or tungsten filament lamps are arranged in banks about wafer 15 for rapidly elevating the temperature of wafer 15 in known manner. One pyrometer 9 is disposed with a field of view 16 that excludes the lamps 17 and includes the quartz chamber 13. The other pyrometer 11 is disposed with a field of view 18 that substantially excludes the lamps 17 and the quartz chamber (through a view port 21 therein which has different radiation transmission characteristics than the walls of the processing chamber 13 (i.e., is effectively transparent at measurement wavelengths)) and includes the bottom or back side of wafer 15. Output signals produced by the pyrometers 9 and 11 in conventional manner in response to radiation received thereby within the respective fields of view thereof are supplied to a central processing unit 23 for determination of emissivity and true temperature of water 15 in accordance with the present invention in order to control the power supplied to the lamps 17 that radiantly heat the wafer 15. Of course, more than two pyrometers, each operating at different wavelengths, may also be used.

Figure 1B:
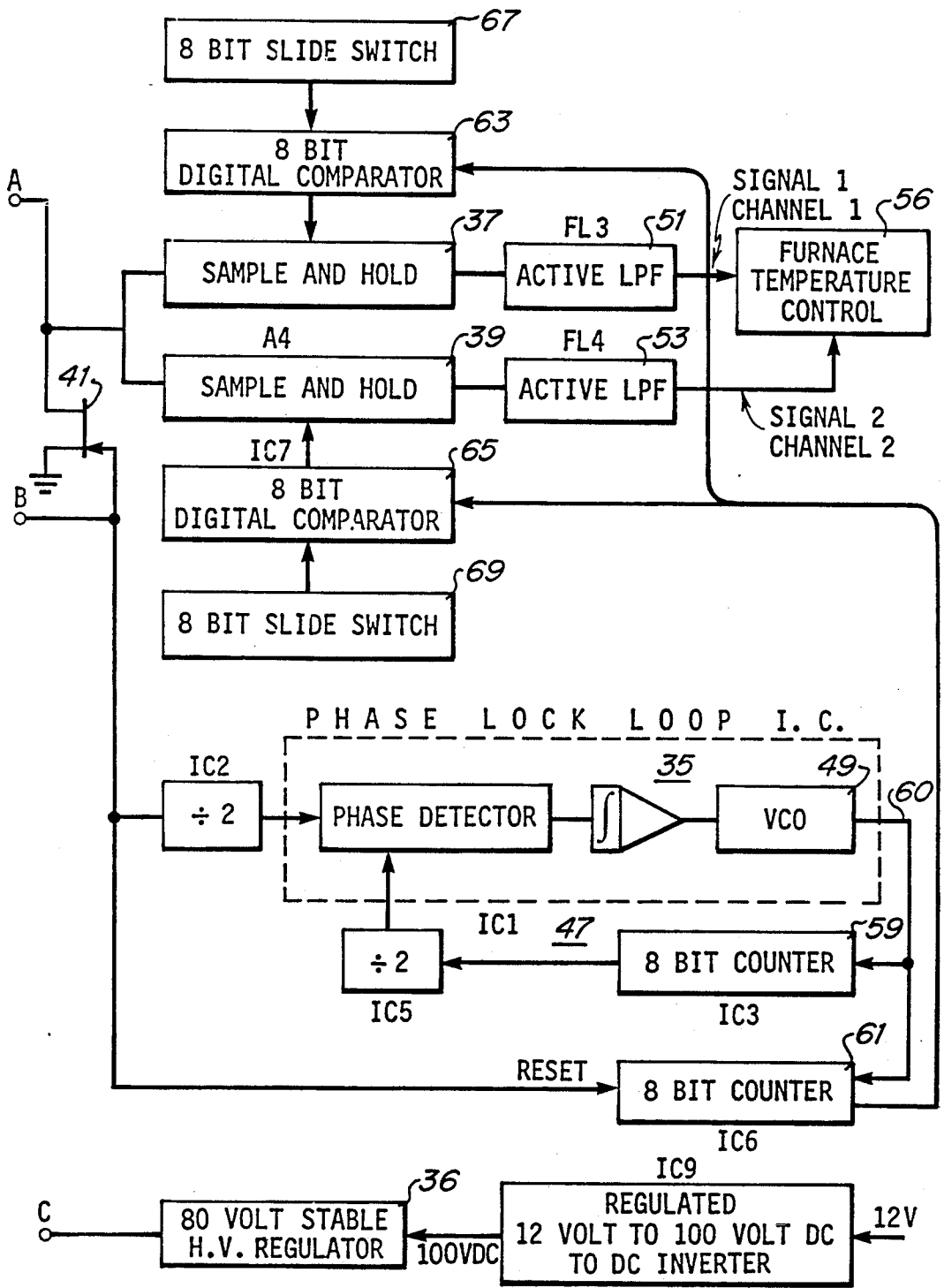

Referring now to FIGS. 1A and 1B, there is shown a schematic diagram of the circuitry according to the illustrated embodiment of the present invention. Radiation 9 including infrared wavelengths from a semiconductor wafer to be measured within a processing furnace passes through a filter wheel 11 to a lead selenide detector 13 which is mounted to be thermally stabilized by a Peltier-junction diode 15. The filter wheel 11 includes at least two optical filters 17, 19 of different waveband characteristics, and also includes an aperture 21 interposed between light-emitting diode (LED) light source 23 and photo detector 25. The thermal stability of the detector 13 is enhanced by the thermister 27 which is thermally coupled thereto to control the cooling current supplied by amplifier 29 to the Peltier-junction diode 15. The filter wheel 11 is rotated by motor 31 at an angular velocity that is set by control circuitry 33. The resulting signal pulses from photo detector 25 attributable to rotation of the aperture 21 between light source 23 and detection 25 thus provides synchronizing signal for the phase-locked loop 35, as later described herein, at a recurring rate of about 100 $H_z$. The filter wheel is coated with high reflectivity, low emissivity coating material such as gold to reduce the dependence of the detector 25 on a dark reference condition between filters, and to reduce the heating of the filter wheel by incoming radiant flux.

In operation, the radiation 9 from the semiconductor wafer which is to be measured while the wafer is in a processing furnace at elevated temperature is filtered cyclicly by two or more filters such as filter 17 or filter 19. These filters are selected for narrow bandwidth (about 0.2 microns FWHM) at a center frequency of approximately 4.77 microns and 3.4 microns as channels 1 and 2, respectively. Channel 1 (centered at 4.77 microns) is used to measure the temperature of the wafer in accordance with conventional pyrometeric techniques, and such temperature information may be used to control the temperature of the wafer in a conventional manner in a rapid-thermal processing system in order to stabilize the temperature of the wafer at a selected elevated temperature. Channel 2 (centered at 3.4 microns) provides information regarding emissivity variations from wafer to wafer. Specifically, with reference to FIGS. 1A and 1B, the lead selenide detector 13 is connected through filter 20 to an 80-volt bias supply 36. The filter 20 attenuates peak transients received on the 80-volt line that biases the detector 13 through load resistor 22. The voltage variations across the detector 13 are AC coupled to the input of amplifier 24, the output of which is supplied to the input of differential amplifier 26 through filter 28. The frequency response of this filter 28 matches the spectral response of the signals produced from the amplifier 24 and has the effect of reducing input transient responses by approximately 10%.

Figure 2:
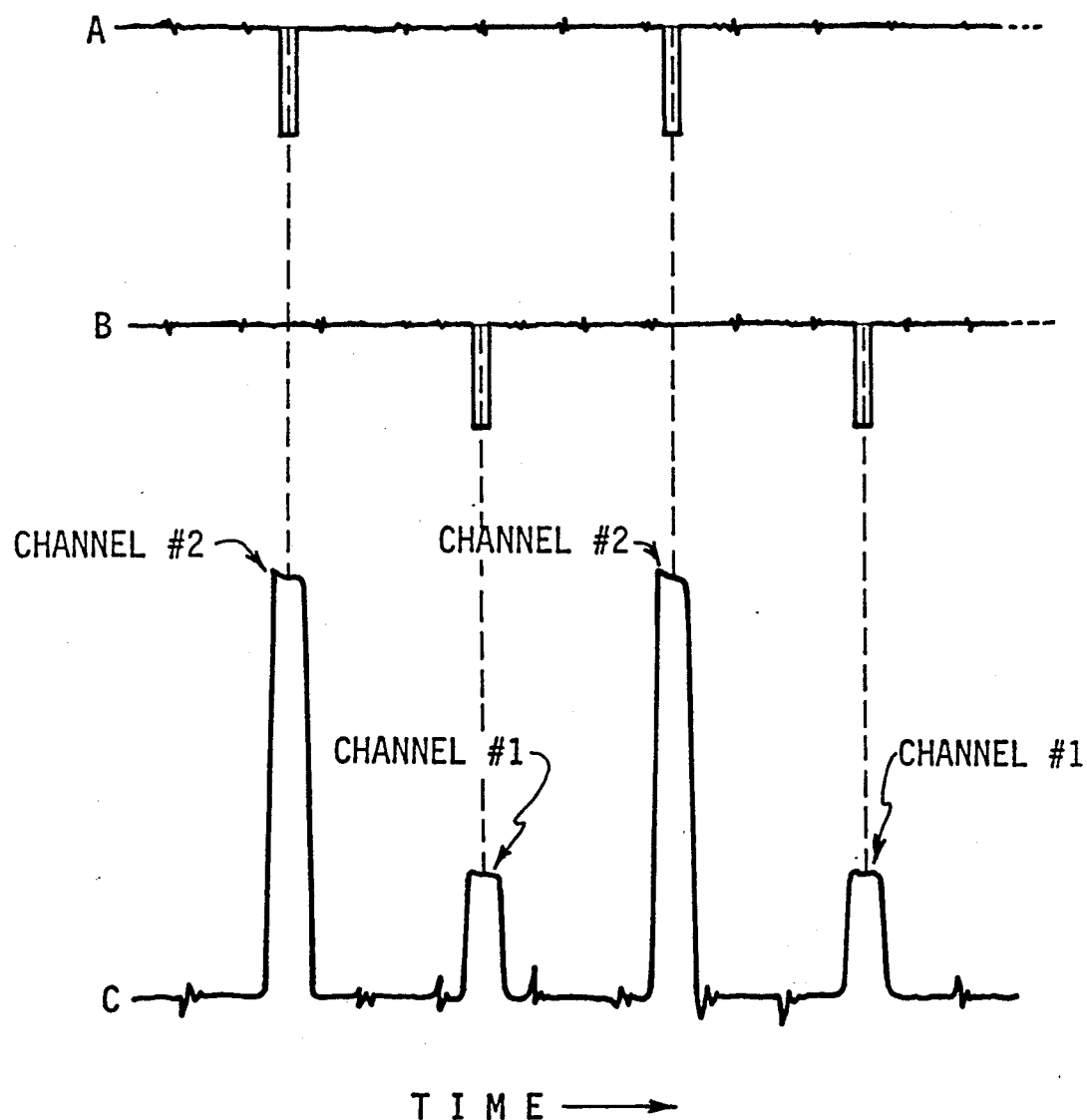
FIG. 2 is a graph of signal amplitude with time in the operation of the present invention.

The output of the differential amplifier 26, as illustrated in FIG. 2, region C, is capacitively coupled to the inputs of two sample-and-hold amplifiers 37, 39. A field-effect transistor 41 is connected to selectively shunt the coupling capacitor 34 to ground during that portion of the chopper cycle in which the detector 13 is blocked, thereby to provide ground reference for the peak signals. The transistor 41 is enabled by a comparator 43 that samples the output of optical detector 25. As the filter wheel 11 rotates, the aperture 21 allows light from the source 23 to saturate the optical transistor of detector 25, thus providing a signal for the comparator 43. Filter 45 is connected to the output of the optical detector 25 to prevent noise from obscuring the edge transitions produced by this detector.

The sample-and-hold amplifiers 37 and 39 are enabled at the peak of the 3.4 micron and 4.7 micron signals coming from the detector 13, as illustrated in FIG. 2, regions A and B, as the filters 17, 19 rotate into position in alignment with the detector 13. The timing circuitry 47 divides the period of the chopper wheel into 256 equal intervals. Any interval can be used as a sampling point by the amplifiers 37 and 39 to latch the magnitude of the signal. The actual timing interval that is chosen may vary by about 1 interval because of the phase-lock loop 35 which utilizes a voltage-controlled oscillator 49 in its phase-lock operation. The response times of the sample-and-hold amplifiers 37 and 39 are very much faster than the interval allowed for responses to light that passes through the filters 17 and 19. The outputs of the amplifiers 37 and 39 are supplied to active filters 51 and 53 which provide the outputs 55, 57 of channel 1 and channel 2, respectively, to CPU 56 for controlling 56 the temperature of the processed wafer, for example, in the manner as illustrated and described in the aforecited pending application for U.S. patent Ser. No. 07/624,206, entitled "Bichannel Radiation Detection Method" filed on even date herewith. Of course, where more than two filters are included in the filter wheel 11, additional signal processing channels similar to the signal processing channels previously described are also included for producing additional output(s) from each such channel for application to CPU 56.

In order to achieve the division of the period of the filter wheel 11 into 256 equal parts and be insensitive to actual time variations of the period, a phase-lock loop 35 is used to generate a clock that is 256 times faster than the period of the filter wheel 11. A conventional phase-lock loop integrated circuit chip is used to generate an approximate 25 KHz clock which drives 8-bit counters 59, 61 from which the carry output of counter 59 serves to drive a toggle that acts as one of the inputs to the phase-lock loop 35. The other input to the phase-locked loop is derived from a toggle that is driven by the comparator 43 which responds to the pulses attributable to light intermittently passing through the aperture 21 of filter wheel 11 to the detector 25. Thus, the 25.6 KHz clock 60 is phase locked to the approximate 100 $H_z$ pulses from the filter wheel 11 and detector 25, and counter 61 is reset each time light passes through aperture 21. Counter 61 thus serves as the period interval counter which supplies its count to two digital comparators 63, 65 that examine the present value of the period counter 61. When the count matches the 8-bit value established by an 8-position switch 67, 69, the output of the digital comparators 63, 65 then enable the sample-and-hold amplifiers 37 and 39 to sample and store the magnitude of the present analog signal from the amplifier 26. The moment within the cycle when the sample is taken and held is thus controlled by the binary value established by the 8-position switches 67, 69.

The interval that is chosen for enabling the sample-and-hold amplifiers 37, 39 is set to capture the flattest portion on the peaks of the signals coming from the detector 13. Since the phase-lock loop 35 may introduce some jitter in the timing of the sampling pulse applied to the sample-and-hold amplifiers 37, 39, the sampling interval is chosen to present a substantial invariant time response during the peak to be sampled, or to present the least amplitude gradient in order to achieve minimum sampling errors.

In accordance with the present invention, the thermistor 27 is located on the cooling surface of a Peltier-junction cooler 15 that keeps the lead selenide detector 13 at a substantially constant temperature. A standard bridge network 71 incorporating the thermistor 27 (biased from a stable voltage reference 73) controls the operational amplifier 29 which is connected as an integrator to drive a power transistor 75 which controls the current in the Peltier-junction cooler 15. Very high loop gain insures tight regulation of the temperature of the lead selenide detector 13 to within less than one-one hundredth of a degree Fahrenheit during normal operation. It is to be noted, however, that the absolute temperature of the detector 13 can not be controlled or inferred. Only the relative temperature variation of the detector is held stable during a processing run of wafers.

What is claimed is:

1. Apparatus for detecting the radiation received through a port from an object at elevated temperature, the apparatus comprising:

detector means disposed to receive radiation through the port from the object for producing an output therefrom indicative of the radiation received thereby;

filter means interposed between the port and the detector means for producing outputs therefrom that are indicative of the radiation received thereby within a selected waveband, said filter means including a plurality of optical filters of different radiation transmissive characteristics that are oriented to be positioned cyclically between the port and the detector means;

circuit means connected to receive the outputs from the detector means for selectively storing and processing a portion of each output produced during a cyclic interval of radiation in a selected waveband of radiation received by the detector means, said circuit means including a plurality of sampling circuits each connected to receive the output from the detector means for producing therefrom a plurality of outputs each indicative of the magnitude of the output of the detector means at a selected period within an interval during which radiation is supplied to the detector means within a selected waveband, said selected period being shorter than said interval and being determined in response to the cyclic operation of the filter means and during which the least amplitude gradient is present.

2. The apparatus as in claim 1 wherein the filter means includes a surface coating on a side thereof oriented toward the detector means in the region thereof between optical filters thereon that exhibits high reflectivity.

3. The apparatus as in claim 2 wherein the surface coating is gold.

4. The apparatus as in claim 2 wherein the side of the filter means oriented away from the detector means includes a surface coating thereon in the region thereof between optical filters thereon that exhibits high reflectivity.

5. The apparatus as in claim 1 comprising:

counter means for operating each sampling circuit during said selected period.

6. The apparatus as in claim 1 wherein said circuit means includes switch means operatively connected to shunt the output of the detector means in a period prior to the interval in which radiation is supplied to the detector means within a selected waveband.

* * * * *